United States Patent
Wu et al.

(10) Patent No.: US 9,146,876 B2
(45) Date of Patent: Sep. 29, 2015

(54) CACHING METHOD AND CACHING SYSTEM USING DUAL DISKS

(71) Applicant: Acer Incorporated, New Taipei (TW)

(72) Inventors: Po-Wei Wu, New Taipei (TW); Hsin-Yu Chen, New Taipei (TW); Hsung-Pin Chang, New Taipei (TW); Ta-Wei Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 189 days.

(21) Appl. No.: 13/863,385

(22) Filed: Apr. 16, 2013

(65) Prior Publication Data

US 2014/0208019 A1   Jul. 24, 2014

(30) Foreign Application Priority Data

Jan. 18, 2013   (TW) .............................. 102102065 A

(51) Int. Cl.
*G06F 12/00*  (2006.01)
*G06F 12/08*  (2006.01)
*G06F 9/44*  (2006.01)

(52) U.S. Cl.
CPC .......... *G06F 12/0866* (2013.01); *G06F 9/4418* (2013.01); *G06F 12/0888* (2013.01); *G06F 2212/1016* (2013.01); *G06F 2212/217* (2013.01); *G06F 2212/222* (2013.01)

(58) Field of Classification Search
CPC ................................ G06F 3/0674; G06F 12/00
USPC ................................... 711/100, 112, 113, 154
See application file for complete search history.

(56) References Cited

U.S. PATENT DOCUMENTS

| | | | | |
|---|---|---|---|---|
| 4,876,662 | A | * | 10/1989 | Pence .............................. 365/78 |
| 5,742,792 | A | * | 4/1998 | Yanai et al. .................... 711/162 |
| 6,381,677 | B1 | * | 4/2002 | Beardsley et al. ............ 711/137 |
| 2003/0131206 | A1 | | 7/2003 | Atkinson et al. |
| 2004/0064647 | A1 | | 4/2004 | DeWhitt et al. |
| 2008/0082743 | A1 | | 4/2008 | Hanebutte et al. |
| 2009/0327608 | A1 | | 12/2009 | Eschmann et al. |

FOREIGN PATENT DOCUMENTS

TW   201224931   6/2012

* cited by examiner

*Primary Examiner* — Tuan Thai
(74) *Attorney, Agent, or Firm* — Jianq Chyun IP Office

(57) ABSTRACT

A caching method and a caching system using dual disks, adapted to an electronic apparatus having a first storage unit and a second storage unit, are provided, in which an access speed of the second storage unit is higher than that of the first storage unit. In the method, a data access to the first storage unit is monitored, a data category of the data in an access address of the data access is identified and whether the data category belongs to a cache category is determined. If the data category belongs to the cache category, an access count of the data in the access address being accessed is accumulated and whether the accumulated access count is over a threshold is determined. If the access count is over the threshold, the data in the access address is cached to the second storage unit.

15 Claims, 5 Drawing Sheets

| Applications | Processes | Services | Performance | Networking | Users | |
|---|---|---|---|---|---|---|
| Task | | | | | | Status |
| [Eric](Busy) | | | | | | Running |
| 2012.09.04_Based on the design of dual-disk system of the OS | | | | | | Running |
| 2012.09.04_Based on the design of dual-disk system of the OS.doc | | | | | | Running |
| Inbox-Eric_Wu@acer.com.tw-Microsoft Outlook | | | | | | Running |
| Intel IDF seminar-Email (HTML) | | | | | | Running |
| MA50 test results-status-Email (HTML) | | | | | | Running |
| RE:MA50 test results-status-Email (HTML) | | | | | | Running |
| WK39_Eric_WeeklyReports_20120927.pptx-Microsoft PowerPoint | | | | | | Running |

| Applications | Processes | Services | Performance | Networking | Users |
|---|---|---|---|---|---|
| Image Name | User Name... | CPU | Memory (... | Description | |
| RIconMan.exe*32 | SYSTEM | 00 | 1,932K | Realtek Card Reader Icon Tool. | |
| POWERPN.EXE*32 | 1111075 | 00 | 54,156K | Microsoft PowerPoint | |
| PccN TMon.exe | 1111075 | 00 | 2,088K | Trend Micro OfficeScan Monitor | |
| OUTLOOK.EXE*32 | 1111075 | 01 | 73.372K | Microsoft Outlook | |
| OSPPSVC.EXE | NETWO... | 00 | 5,564K | Microsoft Office Software Protect | |
| NvXDSync.exe | SYSTEM | 00 | 7,368K | NVIDA User Experience Driver Co | |
| nvvsvc.exe | SYSTEM | 00 | 8,500K | NVIDA Driver Helper Service, Vers | |
| nvvsvc.exe | SYSTEM | 00 | 2,724K | NVIDA Driver Helper Service, Vers | |
| nusb3mon.exe*32 | 1111075 | 00 | 1,564K | USB 3.0 Monitor | |
| Ntrtscan.exe | SYSTEM | 00 | 2,128K | Trend Micro Common Client Real | |

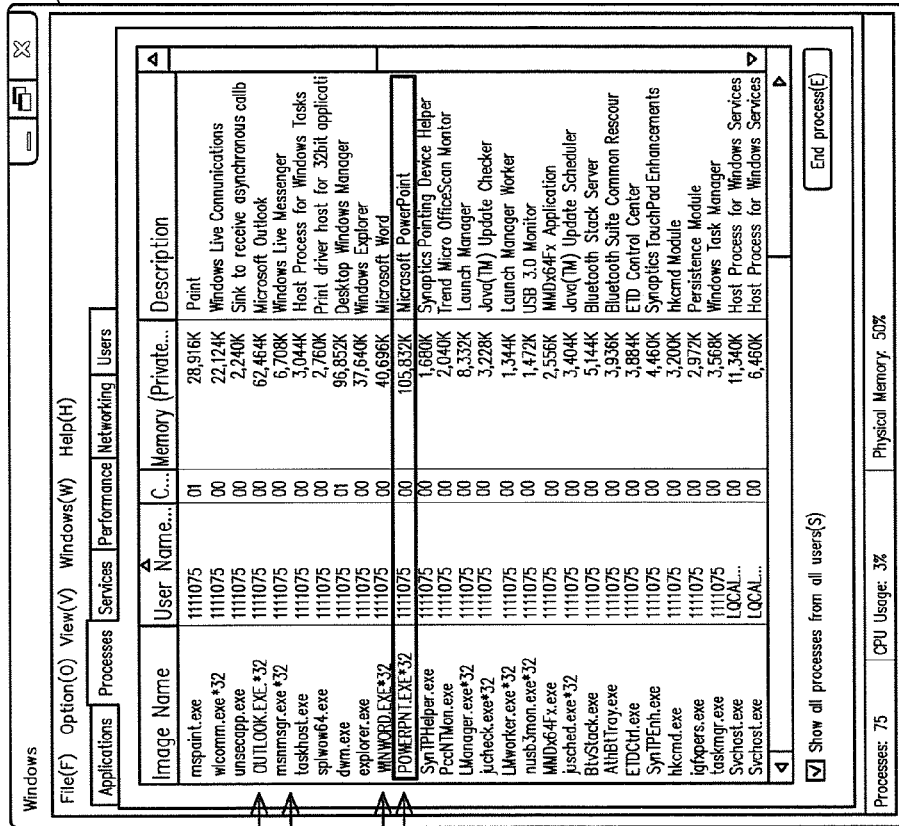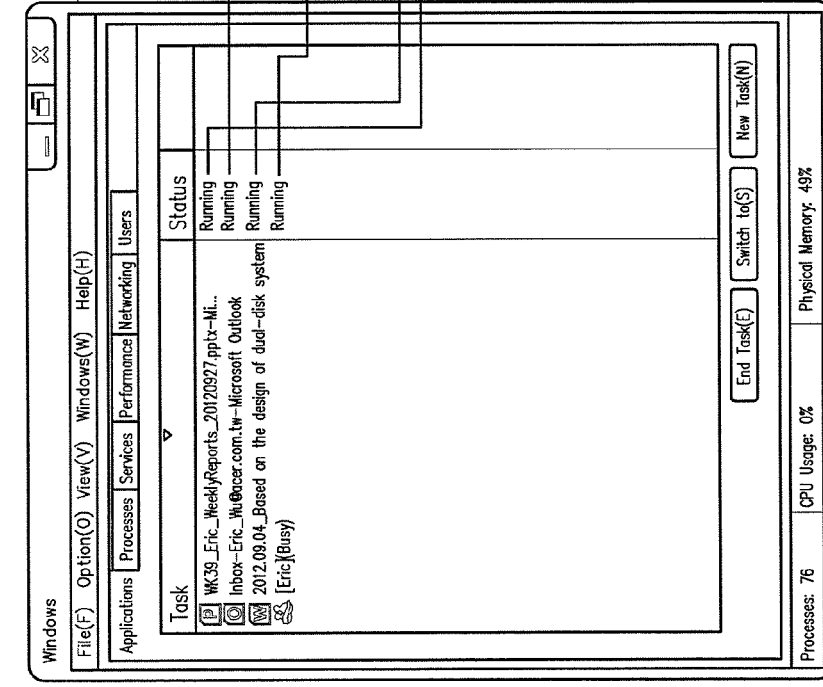
FIG. 5

CACHING METHOD AND CACHING SYSTEM USING DUAL DISKS

CROSS-REFERENCE TO RELATED APPLICATION

This application claims the priority benefit of Taiwan application serial no. 102102065, filed on Jan. 18, 2013. The entirety of the above-mentioned patent application is hereby incorporated by reference herein and made a part of this specification.

BACKGROUND

1. Field of the Invention

The present invention is directed to a caching method and a caching system and more particularly, to a caching method and a caching system applied in an electronic apparatus having dual disks.

2. Description of Related Art

With the development of the semiconductor technology, capacity of a memory has dramatically increased, and a flash memory is particularly suitable to be used in a portable electronic apparatus for having characteristics, such as non-volatility, low power consumption, or small volume. Therefore, in recent years, a NAND flash memory is gradually used as a storage medium of a solid-state drive (SSD) in considering the volume.

The special features of the SSD lie in replacing the mechanical structure of a hard disk drive (HDD) by utilizing the characteristics of flash memory and performing data accesses by writing and erasing memory blocks. Thus, the efficiency of reading from and writing into a storage apparatus may be significantly improved. Comparing with the traditional storage apparatus, the SSD has advantages, such as low power consumption, shock resistance, low temperature resistance and high stability. Under the consideration of volume, the SSD has gradually become the main data storage apparatus adopted by the portable electronic apparatus.

However, due to the expensive price, a capacity of the SSD capable of being equipped by a consumer electronics product in the market is quite limited. Thus, a dual-disk system composed of a HDD with a high capacity and a SSD with a small capacity has gradually become popular. Therein, the main data accesses are still from the HDD, and the SSD is used as a "cache space" and a "data storage region in a sleep mode". Accordingly, on one hand, an average data access speed of a PC platform is dramatically improved, while on the other hand, the time of resuming from the sleep mode is effectively shortened. In order to effectively use the small-capacity SSD, it is necessary to design a dual-disk system capable of being implemented and has high efficiency according to the features of the currently existing operation systems.

SUMMARY

Accordingly, the present invention is directed to a caching method and a caching system using dual disks capable of improving efficiency of data access and system resume.

The present invention is directed to a caching method using dual disks, which is adapted to an electronic apparatus having a first storage unit and a second storage unit, wherein an access speed of the second storage unit than that of the first storage unit. In the method, a data access to the first storage unit is monitored, a data category of the data in an access address of the data access is identified, and whether the data category belongs to a cache category is determined. If the data category belongs to the cache category, an access count of the data in the access address being accessed is accumulated, and whether the accumulated access count is over a threshold is determined. If the access count is over the threshold, the data in the access address is cached to the second storage unit.

The present invention is directed to a caching system using dual disks, which includes a monitoring module, an identification module and a cache module. The monitoring module is configured to monitor a data access to a first storage unit. The identification module is configured to identify a data category of data in an access address of the data access and determine whether the data category belongs to a cache category. If the data category belongs to the cache category, the cache module accumulates an access count of the data in the access address being accessed and if the accumulated access count is over the threshold, the data in the access address is cached to a second storage unit. An access speed of the second storage unit is higher than that of the first storage unit.

To sum up, in the caching method and the caching system using dual disks of the present invention, data accessed by an operation system is categorized, and only background processes are cached to a solid-state drive (SSD) with discarding foreground applications, such that the limited cache space is efficiently utilized. Additionally, in the present invention, when the system resumes from a sleep mode, the background processes are firstly loaded, and then other data is loaded until the desktop is resumed. As such, the time of resuming the desktop may be effectively shortened.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

FIG. 1A and FIG. 1B respectively illustrate an application list and a process list according to an embodiment of the present invention.

FIG. 5 illustrates an application list and a process list according to an embodiment of the present invention.

DESCRIPTION OF EMBODIMENTS

Generally, in an operation system (OS), the data being accessed most frequently is the background processes, which can be categorized into three types, system service processes, general usage processes and application software processes. The system service processes and the general usage processes are indispensable elements (e.g. explore.exe, svchost.exe, or winlogon.exe) for normal operation of a computer, and the application software processes are commonly related to applications. For instance, while a document file Abc.docx is edited in the foreground, an executable file WINWORD.exe is shown in a process list of the operation system, and the file Abc.docx is shown in an application list. The aforesaid process is a main program to open Word, while the application is installed on the main program of Word and configured to open a specific file.

For instance, FIG. 1A and FIG. 1B respectively illustrate an application list and a process list according to an embodiment of the present invention. First, referring to FIG. 1A, when a user runs an application "outlook" to open an email, a plurality of applications 12 related to "outlook" are shown in the application list of the task manager of the OS. The applications 12 are generated according to a window corresponding to each email in the mailbox. However, no matter which application is used, the same process "OUTLOOK.EXE*32" 14 in the process list illustrated in FIG. 1B is corresponded to. Based on the premise of saving cache space, a target cached by the caching system of the present invention is the process instead of the application.

In order to efficiently utilize a solid-state drive (SSD) with limited capacity and high price, a target to be cached by the present invention points to all of the background processes (which have a small amount but frequently used data) instead of specific files (which have a great amount but seldom used data) or applications. In the present invention, currently running applications and processes are further obtained from the OS, and an access count of the processes is accumulated for determining whether to perform a caching operation.

Figure 2:
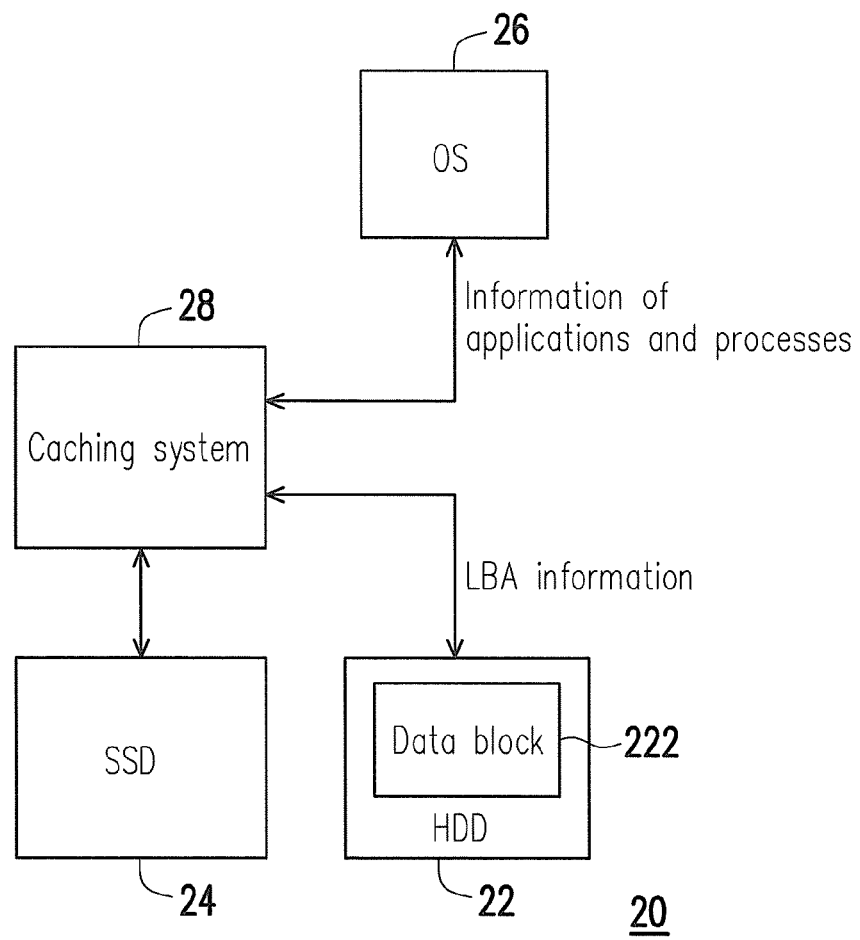
FIG. 2 is a schematic diagram illustrating a system using dual disks according to an embodiment of the present invention.

FIG. 2 is a schematic diagram illustrating a system using dual disks according to an embodiment of the present invention. Referring to FIG. 2, in the present embodiment, a dual-disk system 20 may be configured in an electronic apparatus having dual storage elements, such as, a mobile phone, a smart phone, a personal digital assistant (PDA), a tablet computer, a desktop computer, or a notebook computer, to provide a caching function.

The dual-disk system 20 includes a hard disk drive (HDD) 22, a solid-state drive (SSD) 24, an operation system (OS) 26 and a caching system 28. The caching system 28 obtains an access frequency of each data block 222 in the HDD 22 being cached by using logical block addressing (LBA) information in the HDD 22. In addition, the caching system 28 obtains information of applications and processes which are currently running from the OS 26. As such, the caching system 28 may decide a category and an amount of data to be cached from the HDD 22 to the SSD 24 according to the access frequency of the data blocks and the information of the applications and the processes, so as to improve the overall data access efficiency of the dual-disk system 20.

Figure 3:
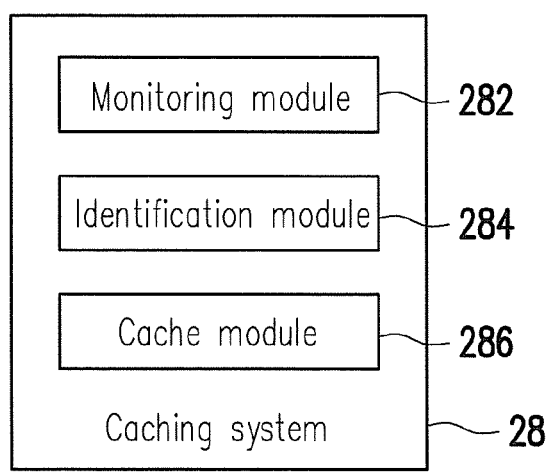
FIG. 3 is a block diagram illustrating a caching system using dual disks according to an embodiment of the present invention.

In detail, FIG. 3 is a block diagram illustrating a caching system using dual disks according to an embodiment of the present invention. In the present embodiment, the detailed implementation of the caching system 28 in the aforementioned embodiment will be further described. The caching system 28 includes a monitoring module 282, an identification module 284 and a cache module 286. The modules may be hardware devices composed of logical circuit elements and perform the caching function or may be programs stored in a storage medium of the electronic apparatus and capable of being loaded into a processor of the electronic apparatus to perform the caching function, which constructs no limitations to the present invention.

Figure 4:
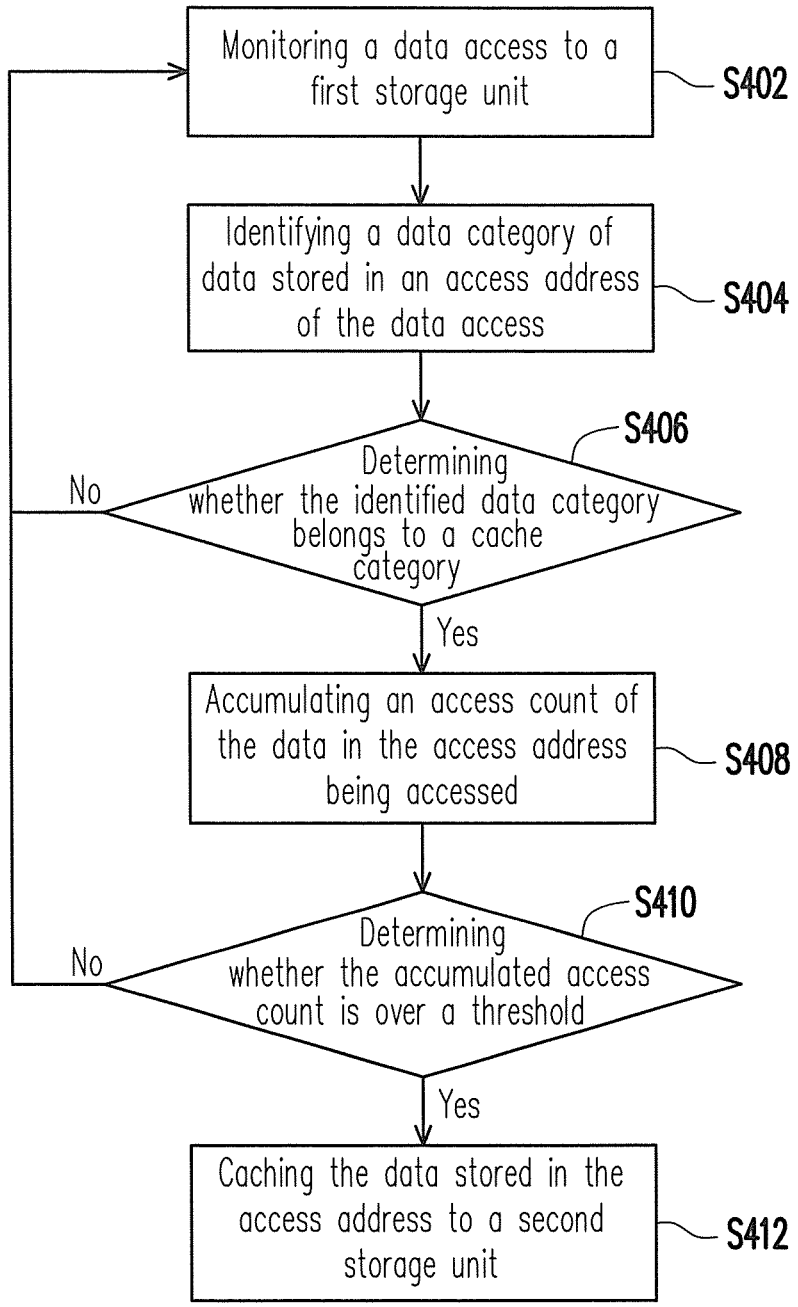
FIG. 4 is a flowchart illustrating a caching method using dual disks according to an embodiment of the present invention.

FIG. 4 is a flowchart illustrating a caching method using dual disks according to an embodiment of the present invention. Referring to both FIG. 3 and FIG. 4, the method of the present embodiment is adapted to the aforementioned caching system 28. Detailed steps of the caching method of the present embodiment will be described with reference to each element of the caching system 28 as follows.

First, the monitoring module 282 monitors a data access to a first storage unit (e.g. the HDD 22) (step S402). Here, each time when the user executes a program or performs an operation on the electronic apparatus, the electronic apparatus accesses the first storage unit to obtain data required for performing the related operation.

Then, the identification module 284 identifies a data category of data in an access address of the data access (step S404). In detail, the identification module 284 sends a request to a host bus adapter (HBA) to obtain the access address of the data access monitored by the monitoring module 282. Then, the identification module 284 may call an application programming interface (API), such as a PSAPI, of the OS 26 to obtain a list showing the currently running applications and processes and statuses thereof, so as to identify a data category of the data in the access address.

Afterward, the identification module 284 determines whether the identified data category belongs to one of at least one cache category (step S406). The cache category includes system service processes and general usage processes, which is not limited herein.

In detail, among the background processes, the system service processes are mainly defined in the category System.ServiceProcess and responsible for shared services, such as disk management, automatic updates, dynamic host configuration protocol (DHCP), memory buffer management, or user logins, in the operation system. The general usage processes includes, for example, a resource manager (e.g. explorer.exe, i.e. the desktop), an executable file (e.g. rundll32.exe) of a built-in function of a dynamic-link library (DLL), an executable file (e.g. ctfmon.exe) of an input method and so forth. The application software processes are referred to executable files related to application software. By pre-loading the processes which are frequently accessed to a storage unit having a higher speed, for example, the SSD, the efficiency of data access may be effectively improved.

If the data category identified by the identification module 284 belongs to the cache category, the cache module 286 accumulates an access count of the data in the access address being accessed (step S408) and determines whether the accumulated access count is over a threshold (step S410). If the access count is over the threshold, the cache module 286 caches the data in the access address to a second storage unit (e.g. the SSD) having a higher access speed (step S412). Accordingly, the overall data access efficiency of the dual-disk system 20 is improved.

In another embodiment, in addition to all of the background processes, the foreground processes is categorized in to application frame and user data by using the architecture of the operation system, and therein, only the application frames are cached with discarding the user data so as to improve the data access efficiency.

For instance, FIG. 5 illustrates an application list and a process list according to an embodiment of the present invention. Referring to FIG. 5, in the present embodiment, an application list 52 of the task manager includes four tasks, which are Powerpoint, Outlook, Word and MSN. The process corresponding to each of the applications may be found in a process list 54 of the task manager, and these processes are foreground processes. As illustrated in FIG. 5, the first task in the application list 52 corresponds to POWERPNT.EXE *32 in the process list 54, the second task corresponds to OUT- LOOK.EXE *32 in the process list 54, the third task corresponds to WINWORD.EXE *32 in the process list 54, and the fourth task corresponds to MSNMSGR.EXE *32 in the process list 54. If it is assumed that the user opens 10 different Word files, the operation system has to open the executable file WINWORD.EXE no matter which file is opened. Accordingly, comparing with the opened user data (in which each file is read only once), the executable file WINWORD.EXE (which is opened for 10 time in total) of one of the foreground processes is more important. Thus, in the present embodiment, the user data is discarded and only the application frame (i.e. the executable file WINWORD.EXE) is cached, so as to improve the data access efficiency.

It is noted that before entering a sleep mode, the operation system dumps all data related to the currently running processes and applications from the memory to the SSD, such that in the system resume, all the data can be rapidly loaded back from the SSD to the memory, so as to achieve an effect of quick resume. Accordingly, in the present invention, a system resume mechanism is combined with the aforementioned cache policy so as to shorten the time for the system to resume the desktop. Another embodiment is illustrated in detail as follows.

Figure 6:
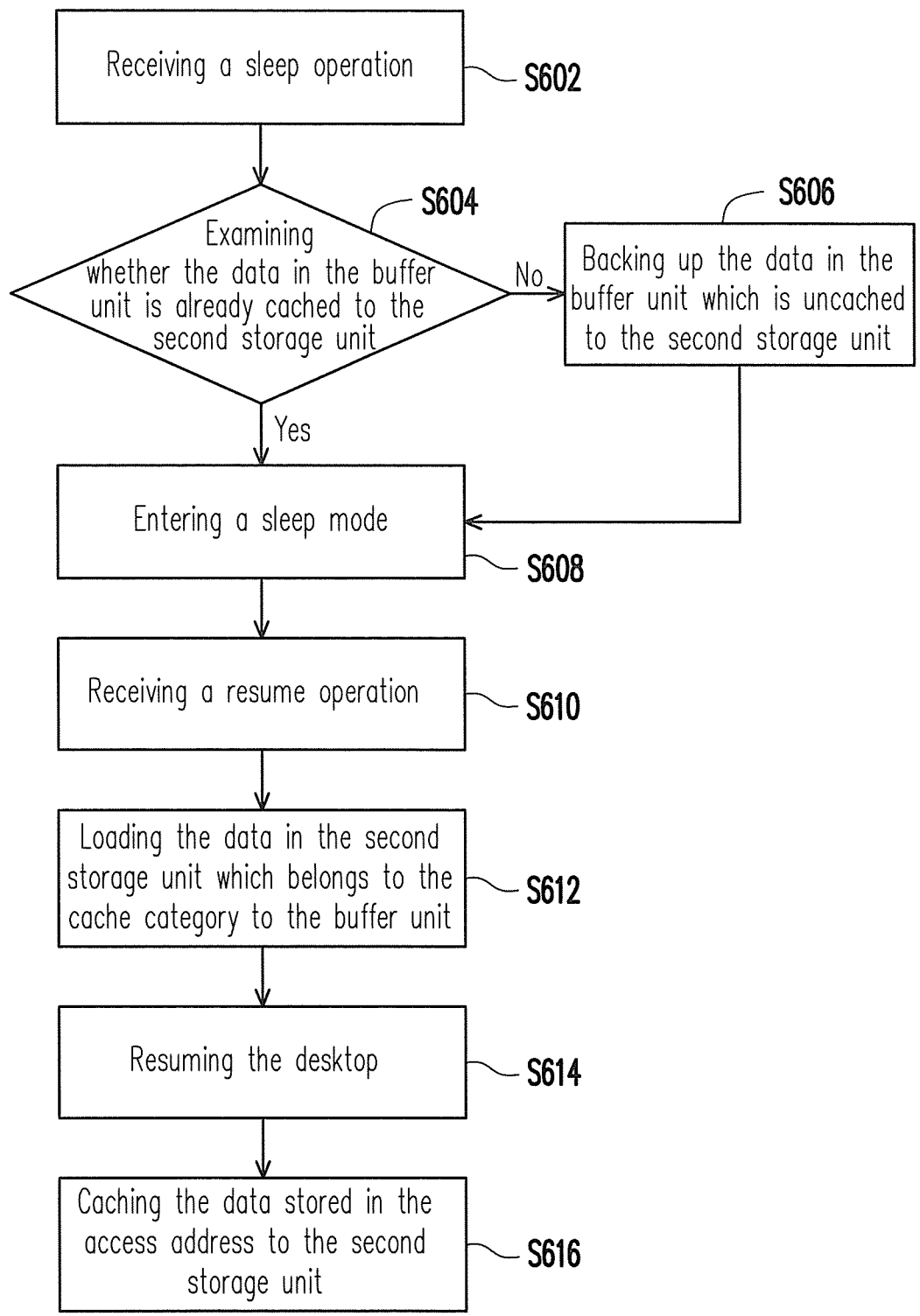
FIG. 6 is a flowchart illustrating a caching method using dual disks according to an embodiment of the present invention.

FIG. 6 is a flowchart illustrating a caching method using dual disks according to an embodiment of the present invention. Referring to both FIG. 3 and FIG. 6, the method of the present embodiment follows the step S412 of the above embodiment. Namely, after the data in the access address is cached to the SSD by the cache module 286, a sleep module (not shown) receives a sleep operation and accordingly backs up the data in the memory to the SSD so as to enter the sleep mode, or receives a resume operation and accordingly loads the data which is backed up in the SSD to the memory so as to resume the normal operation mode. Detailed steps of the caching method of the present embodiment will be described with reference to each element of the caching system 28 as follows.

First, the sleep module (not shown) receives the sleep operation (step S602) so as to back up data in a buffer unit (not shown) of the electronic apparatus to the second storage unit. The sleep operation is triggered and generated, for example, by the user pressing a sleep button of the operation system, or by the operation system under a condition of not receiving an operation within a predetermined time period, but the present invention is not limited thereto. Additionally, the buffer unit is, for example, a random-access memory (RAM) or any other type of memory, but the present invention is also not limited thereto.

It is noted that through the caching of the cache module 286 in the above embodiment, a portion of the data in the buffer unit has already cached in the second storage unit. Thus, after receiving the sleep operation, the sleep module, for example, examines whether the data in the buffer unit of the electronic apparatus is already cached to the second storage unit (step S604).

Therein, if the sleep module determines that there is a portion of the data in the buffer unit not yet cached to the second storage unit, the sleep module backs up the uncached data in the buffer unit to the second storage unit (step S606) and then enters the sleep mode (step S608). The aforementioned uncached data includes applications and application software processes. Otherwise, if the sleep module determines that all of the data in the buffer unit is already cached to the second storage unit, the sleep module may directly enter the sleep mode (step S608).

In the sleep mode, the sleep module, for example, continues to detect the resume operation issued by the user. When receiving the resume operation (step S610) the sleep module loads the data which is previously stored or backed up in the second storage unit to the buffer unit, so as to resume the system back to the normal operation mode. In the process of resuming the system, the sleep module, for example, firstly loads the data in the second storage unit which belongs to the cache category to the buffer unit (step S612). The data belonging to the cache category is, for example, the system service processes and the general usage processes which are indispensable to maintain the system in the normal operation, and after the processes are loaded, the sleep module may rapidly resume the desktop of the operation system (step S614).

Finally, in the situation of resuming the desktop, the sleep module continues to load the data in the second storage unit which does not belong to the cache category to the buffer unit (step S616) so as to complete the system resume. The aforementioned data which does not belong to the cache category is, for example, applications and application software processes. Accordingly, the time of the system resuming from the sleep mode may be shortened, and a time point for the user to start any other task after the sleep mode may be as earlier as possible, such that the user is provided with good usage experience.

In view of the foregoing, the caching method and the caching system using dual disks of the present invention utilizes the information capable of being obtained by the operation system to categorize data accesses executed by the electronic apparatus into foreground applications and background processes, and caches the background processes to the SSD having a higher speed with discarding the foreground applications, so as to improve the data access efficiency under the situation that the SSD has limited capacity. In addition, the present invention further categorizes the applications and the processes according to an order of priority. When the computer resumes from the sleep mode, the processes having the higher priority are waked up, and the processes and applications having lower priority are then waked up until the desktop is resumed, such that the time of resuming the desktop can be effectively shortened.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A caching method using dual disks, adapted to an electronic apparatus having a first storage unit and a second storage unit, wherein an access speed of the second storage unit is higher than an access speed of the first storage unit, the method comprising:
    monitoring a data access to the first storage unit;
    identifying a data category of data in an access address of the data access and determining whether the data category belongs to one of at least one cache category;
    if the data category belongs to the at least one cache category, accumulating an access count of the data in the access address being accessed and determining whether the accumulated access count is over a threshold; and
    if the access count is over the threshold, caching the data in the access address to the second storage unit.

2. The method according to claim 1, wherein before the step of identifying the data category of the data in the access address of the data access, the method further comprises:
    requesting a host bus adapter (HBA) to obtain the access address of the data access.

3. The method according to claim 1, wherein the data of the at least one cache category comprises system service processes and general usage processes, or comprises the system service processes, the general usage processes and application frames.

4. The method according to claim 1, wherein after the step of caching the data in the access address to the second storage unit, the method comprises:
receiving a sleep operation to enter a sleep mode after data in a buffer unit of the electronic apparatus is backed up to the second storage unit.

5. The method according to claim 4, wherein the step of backing up the data in the buffer unit of the electronic apparatus to the second storage unit comprises:
examining whether the data in the buffer unit is cached to the second storage unit; and
backing up data in the buffer unit which is uncached to the second storage unit to the second storage unit.

6. The method according to claim 5, wherein the data which is uncached to the second storage unit comprises applications and application software processes.

7. The method according to claim 5, wherein the buffer unit comprises a random-access memory (RAM).

8. The method according to claim 4, wherein after the step of backing up the data in the buffer unit of the electronic apparatus to the second storage unit, the method comprises:
receiving a resume operation to resume a normal operation mode after the data which is previously stored or backed up in the second storage unit is loaded to the buffer unit.

9. The method according to claim 8, wherein the step of loading the data which is previously stored or backed up in the second storage unit to the buffer unit comprises:
firstly loading the data in the second storage unit which belongs to the cache category to the buffer unit.

10. The method according to claim 1, wherein the first storage unit is a general type hard disk drive (HDD), and the second storage unit is a solid-state drive (SSD).

11. A caching system using dual disks, comprising:
a monitoring module, configured to monitor a data access to a first storage unit;
an identification module, configured to identify a data category of data in an access address of the data access and determine whether the data category belongs to one of at least one cache category; and
a cache module, configured to accumulate an access count of the data in the access address being accessed if the data category belongs to the at least one cache category and cache the data in the access address to a second storage unit if the accumulated access count is over the threshold, wherein an access speed of the second storage unit is higher than an access speed of the first storage unit.

12. The system according to claim 11, wherein the identification module further requests a host bus adapter (HBA) to obtain the access address of the data access.

13. The system according to claim 11, further comprising:
a sleep module, configured to receive a sleep operation to enter a sleep mode after data in a buffer unit is backed up to the second storage unit,
wherein the sleep module further examines whether the data in the buffer unit is cached to the second storage unit and backs up data in the buffer unit which is uncached to the second storage unit to the second storage unit.

14. The system according to claim 13, wherein the data which is uncached to the second storage unit comprises applications and application software processes.

15. The system according to claim 13, wherein the sleep module further receives a resume operation to resume a normal operation mode after the data which is previously stored or backed up in the second storage unit is loaded to the buffer unit,
wherein the sleep module further firstly load the data in the second storage unit which belongs to the cache category to the buffer unit.

* * * * *